United States Patent [19]

Paul et al.

[11] Patent Number: 4,493,293
[45] Date of Patent: Jan. 15, 1985

[54] HYDRODYNAMIC DEVICE

[75] Inventors: Jürgen Paul, Stuttgart; Andreas Braatz, Rutesheim; Hans Hanke, Stuttgart, all of Fed. Rep. of Germany

[73] Assignee: Daimler-Benz Aktiengesellschaft, Fed. Rep. of Germany

[21] Appl. No.: 550,131

[22] Filed: Nov. 9, 1983

[30] Foreign Application Priority Data

Nov. 12, 1982 [DE] Fed. Rep. of Germany ....... 3241835

[51] Int. Cl.³ ............................. F01P 5/04; F01P 5/12
[52] U.S. Cl. ............................. 123/41.12; 123/41.46; 123/142.5 R; 192/58 A; 192/82 T
[58] Field of Search ............... 123/41.44, 41.46, 41.47, 123/41.01, 41.12, 142.5 R; 192/58 A, 82 T; 165/51

[56]  References Cited

U.S. PATENT DOCUMENTS

| 2,452,264 | 10/1948 | Russell | 123/41.46 |
| 2,530,180 | 11/1950 | Russell | 123/41.46 |
| 2,837,069 | 6/1958 | Nutt | 123/41.42 |
| 3,272,188 | 9/1966 | Sabat | 123/41.46 |
| 3,481,148 | 12/1969 | Muller et al. | 192/58 A |
| 3,483,852 | 12/1969 | Newman et al. | 123/41.42 |
| 4,081,066 | 3/1978 | Ryba | 192/82 T |

FOREIGN PATENT DOCUMENTS 1476425 4/1970 Fed. Rep. of Germany .
3147468 12/1982 Fed. Rep. of Germany .

Primary Examiner—William A. Cuchlinski, Jr.
Attorney, Agent, or Firm—Craig & Burns

[57] ABSTRACT

A hydrodynamic device, including a vaned rotor wheel, a vaned stator wheel and an electromagnetic clutch, is located, as a heater, in a cooling water circuit of an internal combustion machine and can be switched on and off as a function of the temperature of the medium to be monitored.

In order to obtain a further use for such a hydrodynamic device, the latter is arranged in such a way that, in a switched position in which it is not effective for heating, it is effective as a hydrodynamic clutch for driving the water pump.

15 Claims, 3 Drawing Figures

HYDRODYNAMIC DEVICE

The invention relates to a hydrodynamic device which includes a vaned rotor, a vaned stator wheel and an electromagnetic clutch, by means of which the hydrodynamic device, located, as a heater, in a cooling water circuit which includes a water pump, of an internal combustion engine, can be switched on and off as a function of a temperature of the medium to be monitored.

A heating device in the cooling water circuit of an internal combustion engine for a motor vehicle is known from the German Offenlegungsschrift No. 31 47 468, which heating device consists of a hydrodynamic brake, which is driven from the internal combustion engine via an electromagnetic clutch, by means of which the drive train for the hydrodynamic brake can be switched on or off. This hydrodynamic brake performs no other function than that of a heating device.

Also known from the German Offenlegungsschrift No. 14 76 425 is a hydrodynamic clutch provided for regulating the rotational speed of a radiator fan, the fluid level of which clutch is controlled automatically as a function of the temperature of the cooling air or of the temperature of the cylinder head. This hydrodynamic clutch performs no other function than the rotational speed control of a radiator fan.

An object of the invention is to develop a hydrodynamic device of the type mentioned at the beginning, in such a way that this hydrodynamic device can be used for an additional function.

It is another object of the invention to develop a hydrodynamic device effective in one condition as a heater which, in a switched position is not effective as heating, but is effective as a hydrodynamic clutch for driving the water pump.

It is another object of the invention to develop a hydrodynamic device for an internal combustion engine which is provided with a fan wherein in a switched position, the hydrodynamic device is effective not for heating but for driving a water pump and a fan.

It is another object of the invention to develop a hydrodynamic device having a vaned stator wheel fixed to a shaft by means of which a water pump may be driven.

It is a further object of the invention to develop a hydrodynamic device which includes a vaned stator wheel connected to a shaft by means of which a water pump and a fan may be driven.

It is another object of the invention to develop a hydrodynamic device having a vaned rotor wheel, the hydrodynamic device having plural positions, in one position of which the hydrodynamic device is effective as a heater, circulating cooling water in a cooling water circuit of an internal combustion engine.

It is a further object of the invention to provide a hydrodynamic brake arranged as a hydrodynamic clutch, so that it is possible to do without a special drive to a water pump and/or a fan, the hydrodynamic device additionally taking over the supply of the cooling medium when the water pump is switched off.

These and other objects, features, and advantages of the present invention will become more apparent from the following description when taken in connection with the accompanying drawings which show, for the purposes of illustration only, one embodiment in accordance with the present invention, and wherein.

Figure 1:
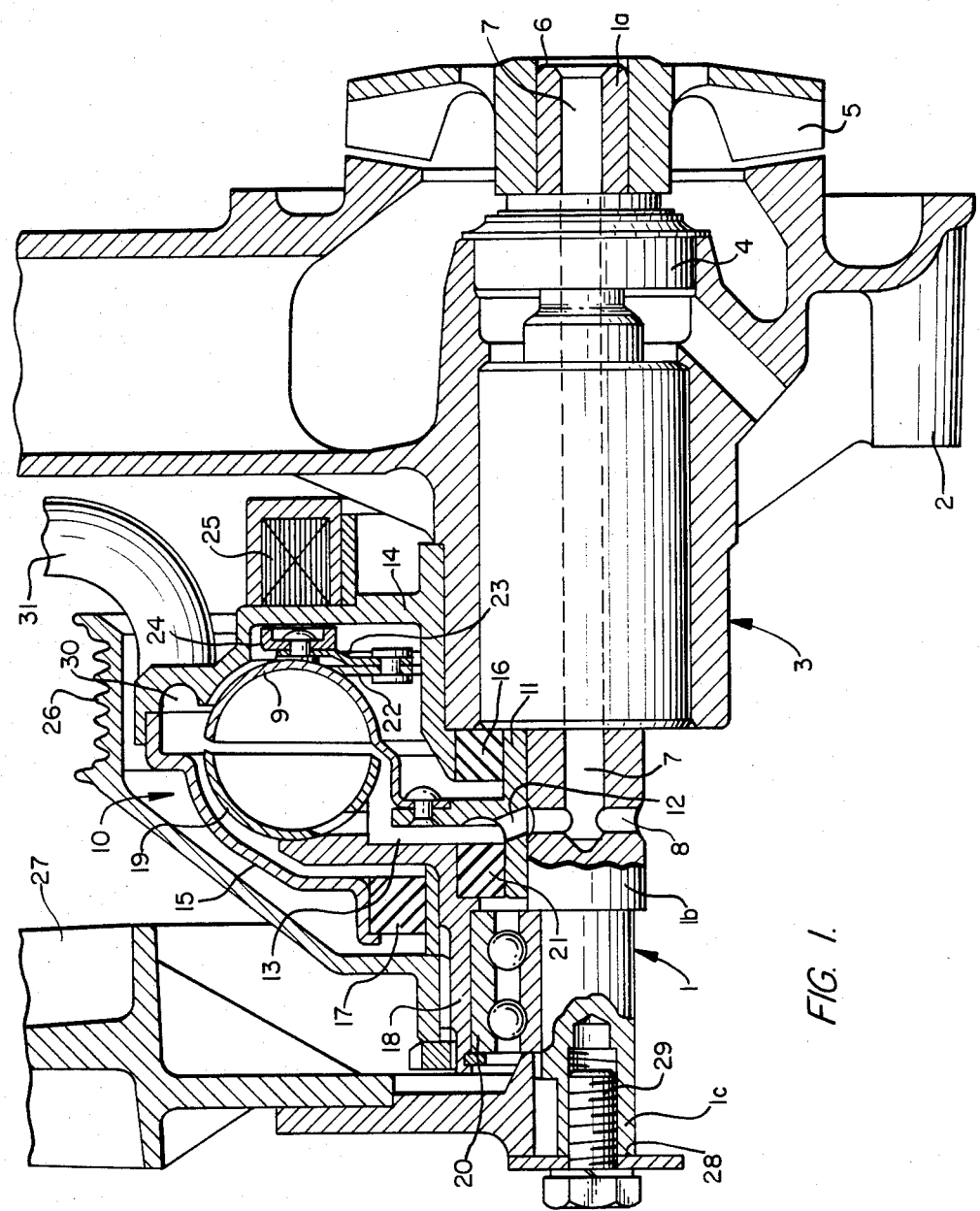
FIG. 1 shows a hydrodynamic device constructed in accordance with the invention.
Figure 2:
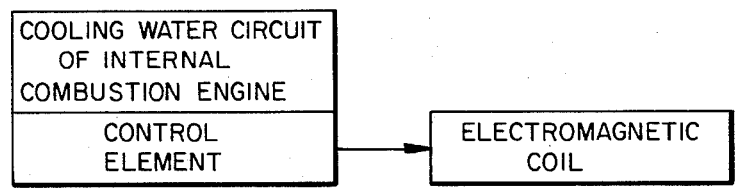
FIG. 2 shows thermal and electrical controls employed in accordance with the invention.

Turning now to a consideration of the drawings wherein like elements are indicated by like reference numerals, and with specific reference to FIG. 1, a shaft 1, is supported in a region of a water pump casing 2. An impeller 5 of a water pump is located on a shaft seating 1a of the shaft 1. A radial seal 4 is located between the bearings for the shaft 1 and the impeller 5. A blind hole 7 is disposed in one end face 6 of the shaft seating 1a, the center line of the blind hole 7 being coaxial with that of the shaft 1. A vaned stator wheel 9 of a hydrodynamic device 10 is mounted on and fixed rotationally with respect to the shaft 1 by means of a hub 11, which is located on the shaft seating 1b. The blind hole 7 ending within the shaft seating 1b is connected to an annular space 13 of the hydrodynamic device 10 by a hole 8 inserted radially in the shaft seating 1b and by means of a hole 12 in the hub 11. A casing of the hydrodynamic device consists of casing parts 14, 15. The casing part 14 is sealed to the hub 11 by a radial seal 16, and the casing part 15 is sealed to a hub 18 by a radial seal 17. Hub 18 is non-rotationally attached to a vaned rotor wheel 19 of the hydrodynamic device 10. The hub 18 is supported on the shaft 1 via a bearing 20. The radial seal 21 is disposed between the hub 18 and the hub 11. An annular disc 22 is attached to the vaned stator wheel 9, to which annular disc 22 is mounted to and fixed for non-rotation with respect to a friction lining 24 by means of a spring element 23. An electromagnetic coil 25 is located on the outside of the casing 14 in the region of the friction lining 24. A fan 27 can also, in an advantageous embodiment, be positively located on a shaft seating 1c of the shaft 1, and is secured, against axial displacement, by means of a screw 29 screwed into one end face 28 of the shaft 1. The hydrodynamic device 10 includes a control element 36 of FIG. 2, not shown in detail, which can be operated as a function of the temperature of a characterizing point on the internal combustion engine. This control element 36 is formed, in particular, by a thermocontact, which is located in the cooling water circuit 35 of the internal combustion engine.

When starting the internal combustion engine, the temperature at the characterizing point of the engine is less than a predetermined limiting value. The thermocontact is therefore closed and the electromagnetic coil 25 is subjected to electric current and causes the friction lining 24 to press against the casing part 14 and a frictional connection to maintain the vaned stator wheel 9 stationary or static so that the impeller 5 of the water pump and the fan 27 are maintained stationary.

The vaned rotor wheel 19 is driven via the belt pulley 26 and the hub 18. The vaned rotor wheel 19 accelerates the cooling water, which experiences a retardation in the vanes of the stator 9 and the energy released by this process heats the cooling water. The necessary cooling water circulation in a cooling circuit of the internal combustion engine occurs by means of the vaned rotor wheel 19, which sucks the cooling water in through the holes 7, 8 and 12 and the annular space 13 and supplies it via an annular space 30 to a conduit 31.

The inlet and outlet openings of the hydrodynamic device should preferably be located in the vicinity of the water pump inlet side and the water pump outlet side, so that the cooling water circulation is similar to the cooling water circulation produced by the water pump.

Figure 3:
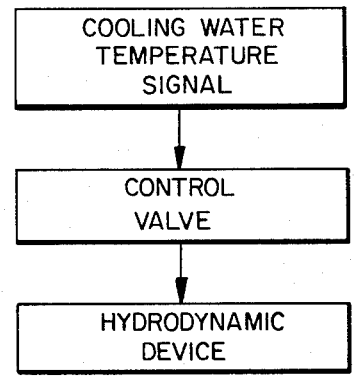
FIG. 3 shows control valve structure with attendant input and output in accordance with the invention.

If the temperature at the characterizing point of the internal combustion engine exceeds a predetermined limiting value, the thermo-contact is opened, the electromagnetic coil 25 is de-energized and the spring element 23 holds the friction lining 24 away from the casing part 14 in the position shown, so that the vaned stator wheel 9 can rotate freely. A control valve 38, in FIG. 3, which controls the filling level of the hydrodynamic device 10 as a function of the cooling water temperature, as sensed at 37, causes the hydrodynamic device 10 to be partially filled, that is, it drives the impeller 5 of the water pump and the fan 27 at only a minimum rotational speed.

If the cooling water temperature increases because of a higher load on the internal combustion engine or a change in the ambient temperature, the control valve 38 modifies the flow to the hydrodynamic device 10, according to the increased cooling water temperature, as sensed at 37. By this means, the fan rotational speed and the impeller rotational speed are increased, so that the belt pulley 26 rotational speed only differs by the known minimum slip of the hydrodynamic device 10.

Further heating of the cooling water in the hydrodynamic device does not occur because the vaned stator wheel 9 rotates at approximately the same rotational speed as the vaned rotor wheel 19, so that the cooling water accelerated by the vaned rotor wheel 19 does not experience sufficient retardation by the vaned stator wheel 9 to create significant additional thermal energy release to the cooling water.

While we have shown and described several embodiments in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. Apparatus for an internal combustion engine comprising
   a cooling circuit having a fluid medium,
   means for heating the fluid medium having a casing and comprising
   turbine rotor means,
   stator means,
   shaft means to which a first one of said rotor means and stator means is rotatably mounted and to which a second one of said rotor means and stator means is fixed for non-rotation,
   at least one of a water pump impeller and fan rotor mounted to said shaft means for non-rotation with respect thereto,
   clutch means for engaging and releasing from rotation of one of said rotor means and stator means with respect to the casing,
   means for actuating said clutch means to one of said engagement and release states to cause the shaft means and at least one of said fan rotor and pump impeller to effect a stationary condition with respect to the casing and to effect rotation with respect to the casing.

2. Apparatus for an internal combustion engine as set forth in claim 1, further comprising
   means sensing the temperature of the fluid medium for operating said actuating means.

3. Apparatus as set forth in claim 1, wherein
   both said fan rotor and pump impeller are actuated by said actuating means.

4. Apparatus for an internal combustion engine set forth in claim 1, further comprising
   a control valve means for controlling the filling level of the means for heating the fluid medium, means sensing the fluid medium temperature for actuating the control valve to effect minimum rotational speed of the water pump impeller when the means for heating the fluid medium is partially filled and to modify the flow of the medium as the temperature of the fluid medium increases.

5. Apparatus for an internal combustion engine as set forth in claim 1, wherein heat transmission to the fluid medium from the means for heating the fluid medium is minimized by effecting minimal relative rotation between said rotor means and stator means and further comprising
   means for sensing the temperature of the fluid medium for actuating the actuating means.

6. Apparatus for an internal combustion engine comprising
   a cooling circuit having a fluid medium,
   means for heating the fluid medium having a casing and comprising
   turbine rotor means,
   stator means,
   shaft means to which a first one of said rotor means and stator means is rotatably mounted and to which a second one of said rotor means and stator means is fixed for non-rotation,
   a water pump impeller mounted to said shaft means for non-rotation with respect thereto,
   clutch means for engaging and releasing from rotation of the stator means with respect to the casing,
   means for actuating said clutch means to one of said engagement and release states to cause the shaft means and pump impeller to effect a stationary condition with respect to the casing and to effect rotation with respect to the casing respectively.

7. Apparatus for an internal combustion engine as set forth in claim 6, further comprising
   means sensing the temperature of the fluid medium for operating said actuating means.

8. Apparatus as set forth in claim 6, further comprising
   fan rotor mounted to said shaft means fixed for non-rotation with respect thereto.

9. Apparatus for an internal combustion engine set forth in claim 6, further comprising
   a control valve means for controlling the filling level of the means for heating the fluid medium, means sensing the fluid medium temperature for actuating the control valve to effect minimum rotational speed of the water pump impeller when the means for heating the fluid medium is partially filled and to modify the flow of the medium as the temperature of the fluid medium increases.

10. Apparatus for an internal combustion engine as set forth in claim 6, wherein heat transmission to the fluid medium from the means for heating the fluid medium is minimized by effecting minimal relative rotation between said rotor means and stator means and further comprising means for sensing the temperature of the fluid medium for actuating the actuating means.

11. A hydrodynamic device, comprising a vaned rotor wheel, a vaned stator wheel and an electromagnetic clutch, by means of which the hydrodynamic device, located, as a heater, in a cooling water circuit of an internal combustion engine, which circuit includes a water pump, can be switched on and off as a function of a temperature of the medium to be monitored, wherein the hydrodynamic device, in the switch position not effective as heating, is effective as a hydrodynamic clutch for driving the water pump.

12. Hydrodynamic device according to claim 11, wherein the internal combustion engine is provided with a fan, wherein the hydrodynamic device, in the switch position not effective as heating, is effective as a hydrodynamic clutch for driving the water pump and the fan.

13. Hydrodynamic device according to claim 12, wherein the vaned stator wheel is connected for non-rotation with respect to a shaft, by means of which the water pump and the fan can be driven.

14. Hydrodynamic device according to claim 11, wherein the vaned stator wheel is connected for non-rotation with respect to a shaft means for driving the water pump.

15. Hydrodynamic device according to claim 11, wherein the vaned rotor wheel of the hydrodynamic device, in the switch position in which the hydrodynamic device is effective as a heater, circulates the cooling water in the cooling water circuit of the internal combustion engine.

* * * * *